(12) United States Patent
Heinze et al.

(10) Patent No.: US 7,365,645 B2
(45) Date of Patent: Apr. 29, 2008

(54) MOBILE LOCATOR SYSTEM AND METHOD WITH WANDER MANAGEMENT

(75) Inventors: Eric T. Heinze, Pewaukee, WI (US); Gregg J. Haensgen, Menomonee Falls, WI (US); Nathan J. Gerner, Sussex, WI (US)

(73) Assignee: RF Technologies, Inc., Brookfield, WI (US)

( * ) Notice: Subject to any disclaimer, the term of this patent is extended or adjusted under 35 U.S.C. 154(b) by 54 days.

(21) Appl. No.: 11/378,804

(22) Filed: Mar. 17, 2006

(65) Prior Publication Data

US 2006/0187045 A1  Aug. 24, 2006

Related U.S. Application Data

(63) Continuation-in-part of application No. 11/043,714, filed on Jan. 26, 2005, now Pat. No. 7,274,294.

(51) Int. Cl.
*G08B 1/08* (2006.01)
*G08B 23/00* (2006.01)
*H04Q 7/00* (2006.01)

(52) U.S. Cl. .............. 340/572.1; 340/573.4; 340/539.13

(58) Field of Classification Search ............. 340/573.4, 340/539.11–539.15, 539.32, 505, 568.1, 572.9
See application file for complete search history.

(56) References Cited

U.S. PATENT DOCUMENTS

| | | | |
|---|---|---|---|
| 4,095,214 A | 6/1978 | Minasy | |
| 4,598,275 A | 7/1986 | Ross et al. | |
| 4,682,155 A | 7/1987 | Shirley | |
| 4,782,345 A | 11/1988 | Landt | |
| 4,814,751 A | 3/1989 | Hawkins et al. | |
| 4,816,839 A | 3/1989 | Landt | |
| 5,014,040 A | 5/1991 | Weaver et al. | |
| 5,268,670 A | 12/1993 | Brasch et al. | |
| 5,317,309 A * | 5/1994 | Vercellotti et al. | 340/10.5 |
| 5,455,575 A | 10/1995 | Schuermann | |
| 5,457,461 A | 10/1995 | Schuermann | |
| 5,485,166 A | 1/1996 | Verma et al. | |
| 5,528,232 A | 6/1996 | Verma et al. | |
| 5,629,981 A | 5/1997 | Nerlikar | |
| 5,640,146 A | 6/1997 | Campana, Jr. | |
| 5,673,037 A | 9/1997 | Cesar et al. | |

(Continued)

FOREIGN PATENT DOCUMENTS

EP  0 405 074 B1  1/1991

(Continued)

OTHER PUBLICATIONS

Accessory Products, WatchMate Wander Prevention Software, printed from website www.xmarksystems.com on Jun. 20, 2005, 4 pages.

(Continued)

*Primary Examiner*—George A Bugg
*Assistant Examiner*—Jennifer A Mehmood
(74) *Attorney, Agent, or Firm*—Foley & Lardner LLP

(57) ABSTRACT

A locator/wander management system includes a handheld unit for providing an interrogation signal. The handheld unit can be a handheld computer or PDA including an RF module. The interrogation signal is received by an RF tag. The RF tag can include a power source and a memory. The memory can store an indication of the date of installation of the battery. The RF tag can provide the indication to the handheld unit in response to the interrogation signal. The RF tag can also provide signals for a wander management system.

20 Claims, 16 Drawing Sheets

U.S. PATENT DOCUMENTS

| | | | |
|---|---|---|---|
| 5,686,902 | A | 11/1997 | Reis et al. |
| 5,767,789 | A | 6/1998 | Afzali-Ardakani et al. |
| 5,768,140 | A | 6/1998 | Swartz et al. |
| 5,771,002 | A | 6/1998 | Creek et al. |
| 5,793,290 | A | 8/1998 | Eagleson et al. |
| 5,825,806 | A | 10/1998 | Tuttle et al. |
| 5,864,580 | A | 1/1999 | Lowe et al. |
| 5,887,269 | A | 3/1999 | Brunts et al. |
| 5,905,798 | A | 5/1999 | Nerlikar et al. |
| 5,914,671 | A | 6/1999 | Tuttle |
| 5,917,425 | A | 6/1999 | Crimmins et al. |
| 5,929,760 | A | 7/1999 | Monahan |
| 5,973,599 | A | 10/1999 | Nicholson et al. |
| 6,052,093 | A | 4/2000 | Yao et al. |
| 6,138,991 | A | 10/2000 | Myers, Jr. |
| 6,154,139 | A | 11/2000 | Heller |
| 6,169,484 | B1 | 1/2001 | Schuchman et al. |
| 6,172,596 | B1 | 1/2001 | Cesar et al. |
| 6,175,308 | B1 | 1/2001 | Tallman et al. |
| 6,198,875 | B1 | 3/2001 | Edenson et al. |
| 6,225,949 | B1 | 5/2001 | Guard |
| 6,236,223 | B1 | 5/2001 | Brady et al. |
| 6,246,882 | B1 | 6/2001 | Lachance |
| 6,285,342 | B1 | 9/2001 | Brady et al. |
| RE37,467 | E | 12/2001 | Brasch et al. |
| 6,347,229 | B1 | 2/2002 | Zelmanovich et al. |
| 6,422,476 | B1 | 7/2002 | Ackley |
| 6,445,297 | B1 | 9/2002 | Nicholson |
| 6,456,239 | B1 | 9/2002 | Werb et al. |
| 6,483,427 | B1 | 11/2002 | Werb |
| 6,486,769 | B1 | 11/2002 | McLean |
| 6,518,885 | B1 | 2/2003 | Brady et al. |
| 6,535,175 | B2 | 3/2003 | Brady et al. |
| 6,542,114 | B1 | 4/2003 | Eagleson et al. |
| 6,563,425 | B2 | 5/2003 | Nicholson et al. |
| 6,593,845 | B1 | 7/2003 | Friedman et al. |
| 6,600,418 | B2 | 7/2003 | Francis et al. |
| 6,608,551 | B1 | 8/2003 | Anderson et al. |
| 6,618,162 | B1 | 9/2003 | Wiklof et al. |
| 6,720,888 | B2 | 4/2004 | Eagleson et al. |
| 6,724,308 | B2 | 4/2004 | Nicholson |
| 6,727,810 | B1 | 4/2004 | Martin et al. |
| 6,747,558 | B1 | 6/2004 | Thorne et al. |
| 6,750,771 | B1 | 6/2004 | Brand |
| 6,761,352 | B2 | 7/2004 | Scicluna et al. |
| 6,765,484 | B2 | 7/2004 | Eagleson et al. |
| 6,784,789 | B2 | 8/2004 | Eroglu et al. |
| 6,812,824 | B1 | 11/2004 | Goldinger et al. |
| 6,825,763 | B2 | 11/2004 | Ulrich et al. |
| 6,838,992 | B2 | 1/2005 | Tenarvitz |
| 6,853,304 | B2 | 2/2005 | Reisman et al. |
| 7,005,985 | B1* | 2/2006 | Steeves ............... 340/572.1 |
| 7,046,141 | B2* | 5/2006 | Pucci et al. ............ 340/539.32 |
| 7,180,420 | B2* | 2/2007 | Maurer ............... 340/572.1 |
| 2002/0075152 | A1 | 6/2002 | Nysen |
| 2002/0101353 | A1 | 8/2002 | Radomsky et al. |
| 2002/0111819 | A1 | 8/2002 | Li et al. |
| 2002/0153996 | A1 | 10/2002 | Chan et al. |
| 2002/0175820 | A1 | 11/2002 | Oja et al. |
| 2003/0005316 | A1 | 1/2003 | Girard |
| 2003/0043042 | A1 | 3/2003 | Moores, Jr. et al. |
| 2003/0095032 | A1 | 5/2003 | Hoshino et al. |
| 2004/0005497 | A1 | 1/2004 | Nunomaki et al. |
| 2004/0100384 | A1 | 5/2004 | Chen et al. |
| 2004/0134984 | A1 | 7/2004 | Powell et al. |
| 2004/0174264 | A1 | 9/2004 | Reisman et al. |
| 2005/0012656 | A1 | 1/2005 | Reisman et al. |
| 2005/0073419 | A1* | 4/2005 | Gary ............... 340/573.1 |
| 2006/0044134 | A1 | 3/2006 | Elliott |

FOREIGN PATENT DOCUMENTS

| | | |
|---|---|---|
| EP | 0 785 527 A2 | 7/1997 |
| WO | WO 90/05960 A1 | 5/1990 |

OTHER PUBLICATIONS

HomeFree Elite—A complete Wireless Resident Monitoring Solution, HomeFree Wireless TelehomeCare Solutions, printed from website www.homefreesys.com on Jun. 21, 2005, 2 pages.

HomeFree Mobile Unit, HomeFree Wireless TelehomeCare Solutions, printed from website www.homefreesys.com on Jun. 21, 2005, 2 pages.

HomeFree On-Site, HomeFree Wireless TelehomeCare Solutions, printed from website www.homefreesys.com on Jun. 21, 2005, 2 pages.

HomeFree On-Time, HomeFree Wireless TelehomeCare Solutions, printed from website www.homefreesys.com on Jun. 21, 2005, 2 pages.

Major Benefits, Care Trak international, Inc., printed from website www.caretrak.com on Jun. 20, 2005, 2 pages.

Nursing Care Facility System, Care Trak International, Inc., printed from website www.caretrak.com on Jun. 20, 2005, 2 pages.

System Overview, WatchMate Wander Prevention System, printed from website www.xmarksystems.com on Jun. 20, 2005, 1 page.

WatchMate Models, WatchMate Wander Prevention System, printed from website www.xmarksystems.com on Jun. 20, 2005, 2 pages.

Wireless TelehomeCare Solutions, HomeFree Wireless TelehomeCare Solutions, printed from website www.homefreesys.com on Jun. 21, 2005, 2 pages.

Letter to Mr. Yale Graves, McGaw, Inc., from Tim Mauck, RF Technologies, Inc., dated Jun. 2, 1997, 1 page.

Letter to Tim Mauck, RF Technologies, Inc., from Yale Graves, McGaw, Inc., dated Apr. 18, 1997, 2 pages.

1996 Governor's New Products Certificate of Merit for the Development of RFT Locator, Wisconsin Society of Professional Engineers, May 17, 1996, 1 page.

RFT Locator, Asset Tracking/Locating System, Apr. 13, 1996, 1 page, RF Technologies, Inc.

Letter to Jack Nelmark, Wis. Society of Professional Engineers, from Glenn F. Jonas, RF Technologies, Inc., dated Mar. 14, 1996, 3 pages.

* cited by examiner

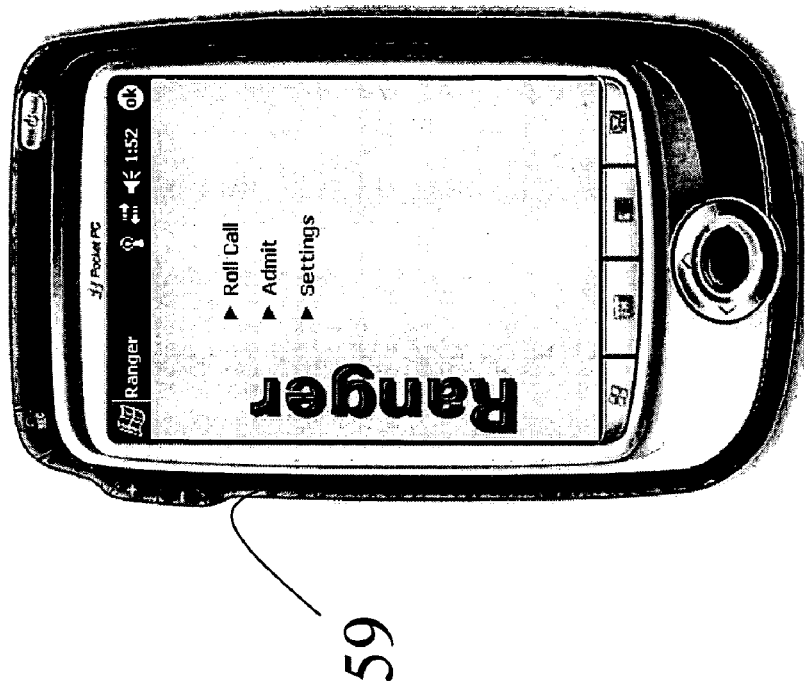
Figure 2B
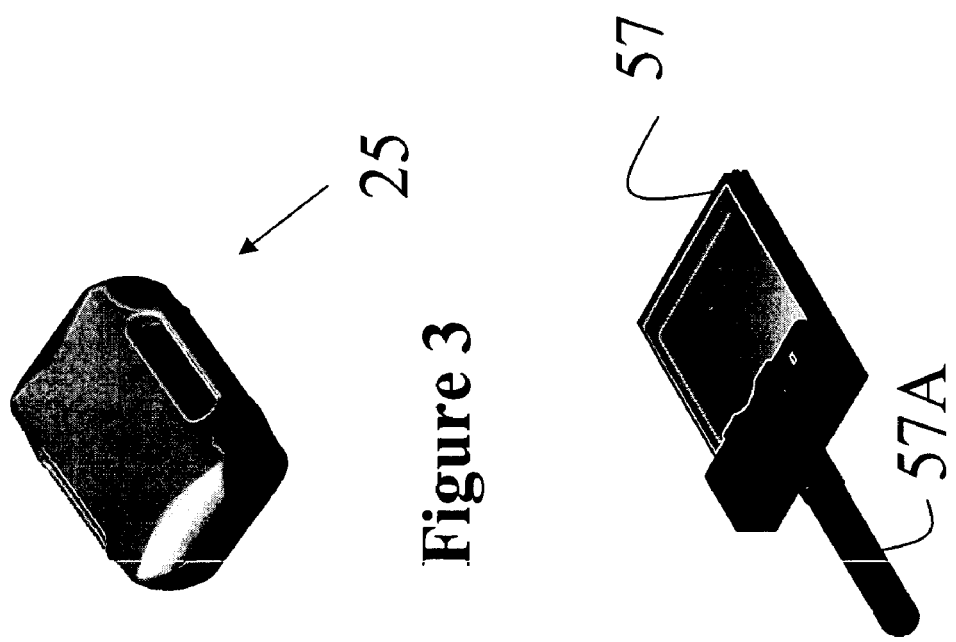
Figure 3
Figure 2A

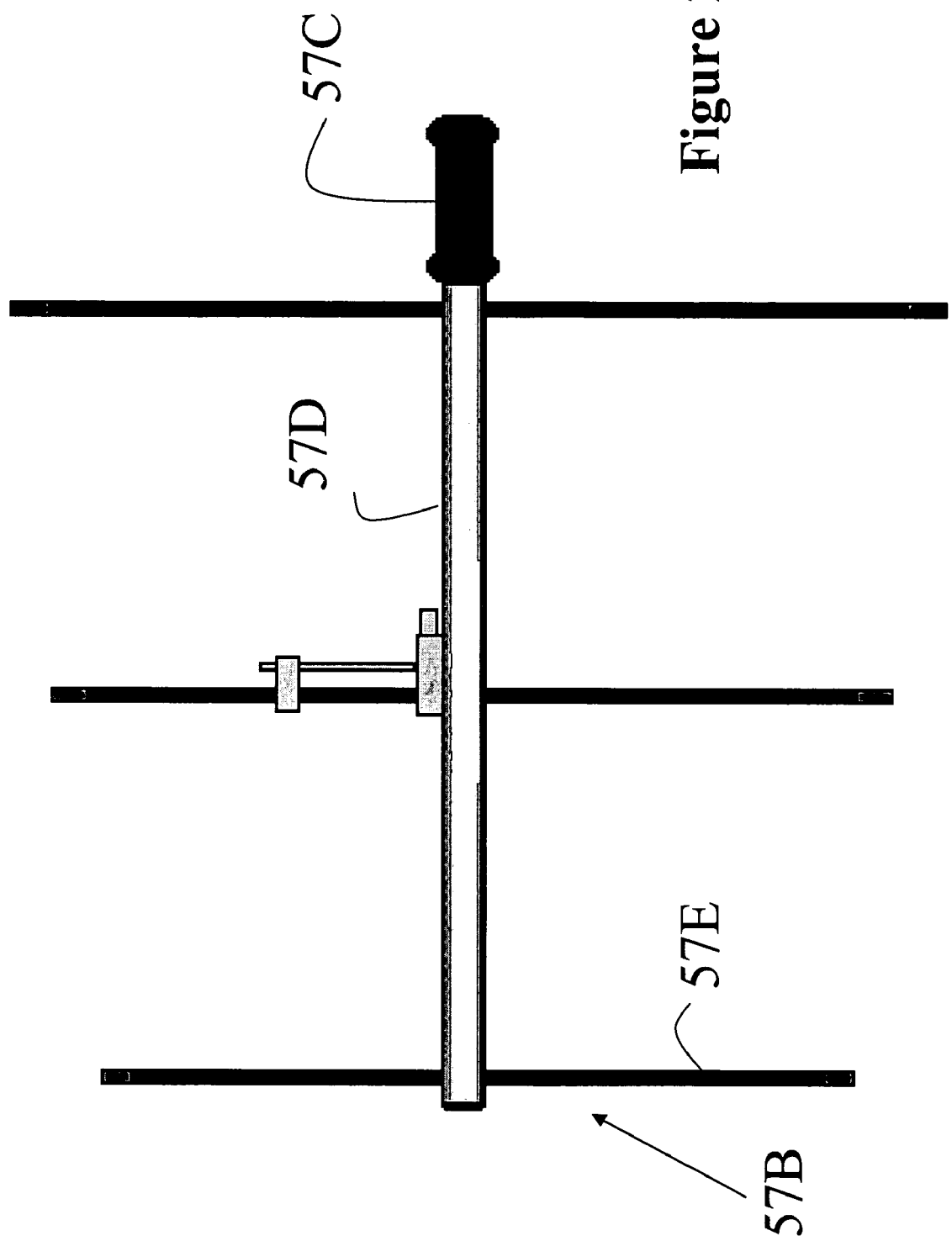

Figure 6

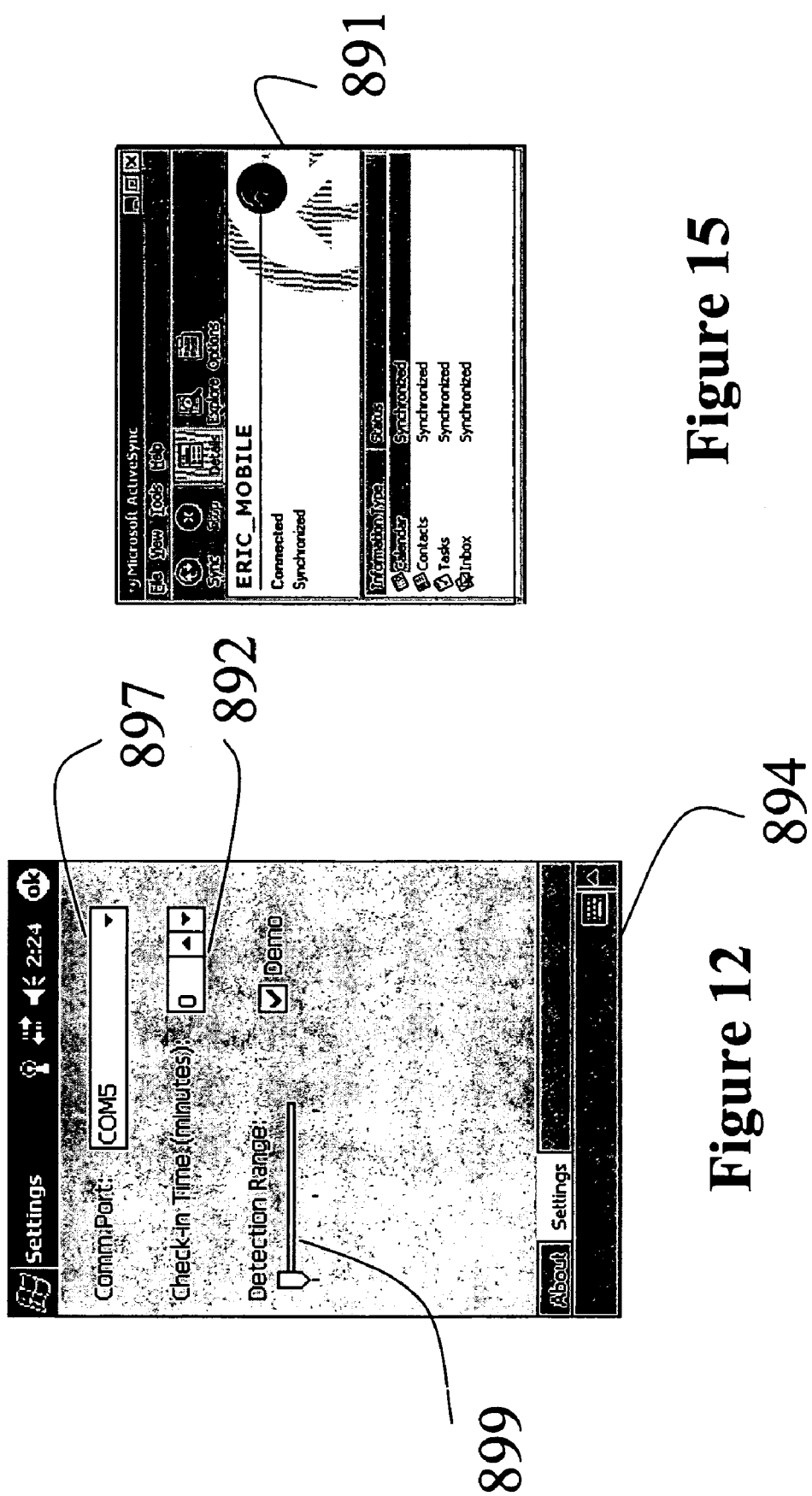

875
875A

876

MOBILE LOCATOR SYSTEM AND METHOD WITH WANDER MANAGEMENT

CROSS REFERENCE TO RELATED APPLICATIONS

The present application is a continuation-in-part of U.S. Pat. No. 7,274,294, issued on Sep. 25, 2007 (U.S. patent application Ser. No. 11/043,714, filed Jan. 26, 2005), entitled MOBILE LOCATOR SYSTEM AND METHOD by Heinze, Haensgen and Hofmeister, assigned to the assignee of the present application and incorporated herein by reference.

BACKGROUND OF THE INVENTION

The present application relates to a locator system. More particularly, the present application relates to a locator system with wander management capability.

Locator systems can be utilized for asset tracking. Locator systems are described in U.S. patent application Ser. No. 11/043,714, filed Jan. 26, 2005, entitled MOBILE LOCATOR SYSTEM AND METHOD by Heinze, Haensgen and Hofmeister, assigned to the assignee of the present application and incorporated herein by reference.

Generally, a locator system is comprised of a handheld transceiver that facilitates remote location of items attached to or integrated with radio frequency (RF) tags. The handheld transceiver is typically a dedicated unit specifically designed to display data, execute software and provide RF signals that wirelessly poll the RF tags. The handheld transceiver includes a memory to store data received from the RF tags. Dedicated handheld units are expensive because they require a user interface, a power supply, a memory, a processor, and RF circuitry.

The RF tags typically include a transceiver and a memory, such as, an electronically erasable programmable read only memory (EEPROM). The transceiver and EEPROM are powered by a battery. The EEPROM of the RF tags are preprogrammed with a specific address or identification number. The RF tags are affixed to the outside of an item or integrated within the equipment that is to be tracked or located.

To locate an asset, the handheld transceiver provides an interrogation signal. All RF tags within the range of the interrogation signal respond to the interrogation signal and provide a signal containing the identification of the RF tag to the handheld transceiver. In certain conventional systems, the RF tag can also generate a beep in response to the interrogation signal to assist the finding of the equipment within the room or area being searched. The operation of the beep or other audible or visual indications can be controlled through the handheld transceiver.

Code Alert® Wander Management Technology by RF Technologies, Inc. comprises a system for monitoring personnel. The personnel are each provided with an RF tag. Each doorway associated with the area within which the monitored personnel are located is provided with a very low frequency (VLF) receiver for receiving a VLF pulse from the tag. The transceiver can receive RF signals from the tag and lock the doorway in response to the tag being within a distance of the receiver. In addition, an alert can be sounded. Information can be sent from the detection point to a central location identifying the resident and his or her location.

U.S. Pat. Nos. 5,793,290, 6,812,824, 6,483,427, and 6,456,239 are assigned to the assignee of the present application and disclose article tracking systems and methods. U.S. Pat. No. 5,793,290, incorporated herein by reference, discloses an RF tag for a wander management system that periodically provides a very low frequency signal (VLF). The tag is also capable of communicating an ultra-high frequency (UHF) signal for supervision and alarms.

Heretofore, locator systems have not been utilized in Code Alert wander management systems. If a resident or asset leaves the monitored area in a conventional wander management system, determining the position of the resident or mobile asset is difficult. Further, wander management systems are not capable of monitoring residents or assets when they are outside of a particular location. For example, conventional wander management systems cannot be practicably utilized on field trips or other instances when residents are given permission to leave the premises.

Accordingly, there is a need for a wander management system that can incorporate a locator system. Further, there is a need for tags that can be utilized with both a wander management system and a locator system. Further still, there is a need for a locator system that has optimized to provide data related to a resident. Further, there is a need for a system and method of monitoring residents in a nursing home or hospital that includes a mobile tag reader and stationary tag readers associated with particular locations.

SUMMARY OF THE INVENTION

An exemplary embodiment relates to a locator/wander management system. The locator/wander management system includes a handheld unit, a tag unit, and at least one wander monitor. The wander monitor is associated with a location, such as a doorway but not limited thereto. The handheld unit receives a beacon signal. The tag unit provides the periodic beacon signal. The handheld unit receives the beacon signal and determines a presence of the tag unit in response to the beacon signal. The tag unit also periodically provides a wander monitor signal, and the wander monitor receives the wander monitor signal. The wander monitor secures an egress or an ingress associated with the location in response to the wander monitor signal.

Another exemplary embodiment relates to a method of locating an article or a person. The method includes providing a first signal with a tag unit associated with the article or person. The method also includes displaying on the handheld computer an indication of the presence of the article or person in response to the first signal and securing an egress or ingress in response to a second signal from the tag unit.

Still another exemplary embodiment relates to a wander management/locator system. The wander management/locator system includes a mobile transceiver for providing an interrogation signal and capable of polling an area, a plurality of tag units, and at least one stationary receiver associated with an exit. Each tag unit responds to the interrogation signal and includes a memory for storing an identification, a UHF circuit and a VLF circuit. The UHF circuit receives the interrogation signal and provides the identification to the handheld unit in response to the interrogation signal using the UHF circuit. The at least one stationary receiver receives the VLF signal and secures the exit when the tag unit is in vicinity of the exit.

BRIEF DESCRIPTION OF THE DRAWINGS

Preferred exemplary embodiments are described below with reference to the accompanying drawings wherein like numeral denote like elements and:

FIG. 2A is a perspective view general schematic drawing of an RF module for use in the system illustrated in FIG. 1 in accordance with another exemplary embodiment;

FIG. 2B is a top view general schematic drawing of a handheld computer for use in the system illustrated in FIG. 1 in accordance with another exemplary embodiment;

FIG. 2C is a top view general schematic drawing of a boom-type directional antenna for use in the system illustrated in FIG. 1 in accordance with still another exemplary embodiment;

FIG. 3 is a perspective view schematic drawing of a tag unit for use in the system illustrated in FIG. 1 in accordance with another exemplary embodiment;

FIG. 6 is a roll call screen shot for the handheld computer illustrated in FIG. 2B;

FIG. 12 is another settings screen shot for the handheld computer illustrated in FIG. 2B;

FIG. 15 is a synchronization screen shot for a host computer communicating with the handheld computer illustrated in FIG. 2B;

DETAILED DESCRIPTION OF THE PREFERRED EMBODIMENTS

Figure 1:
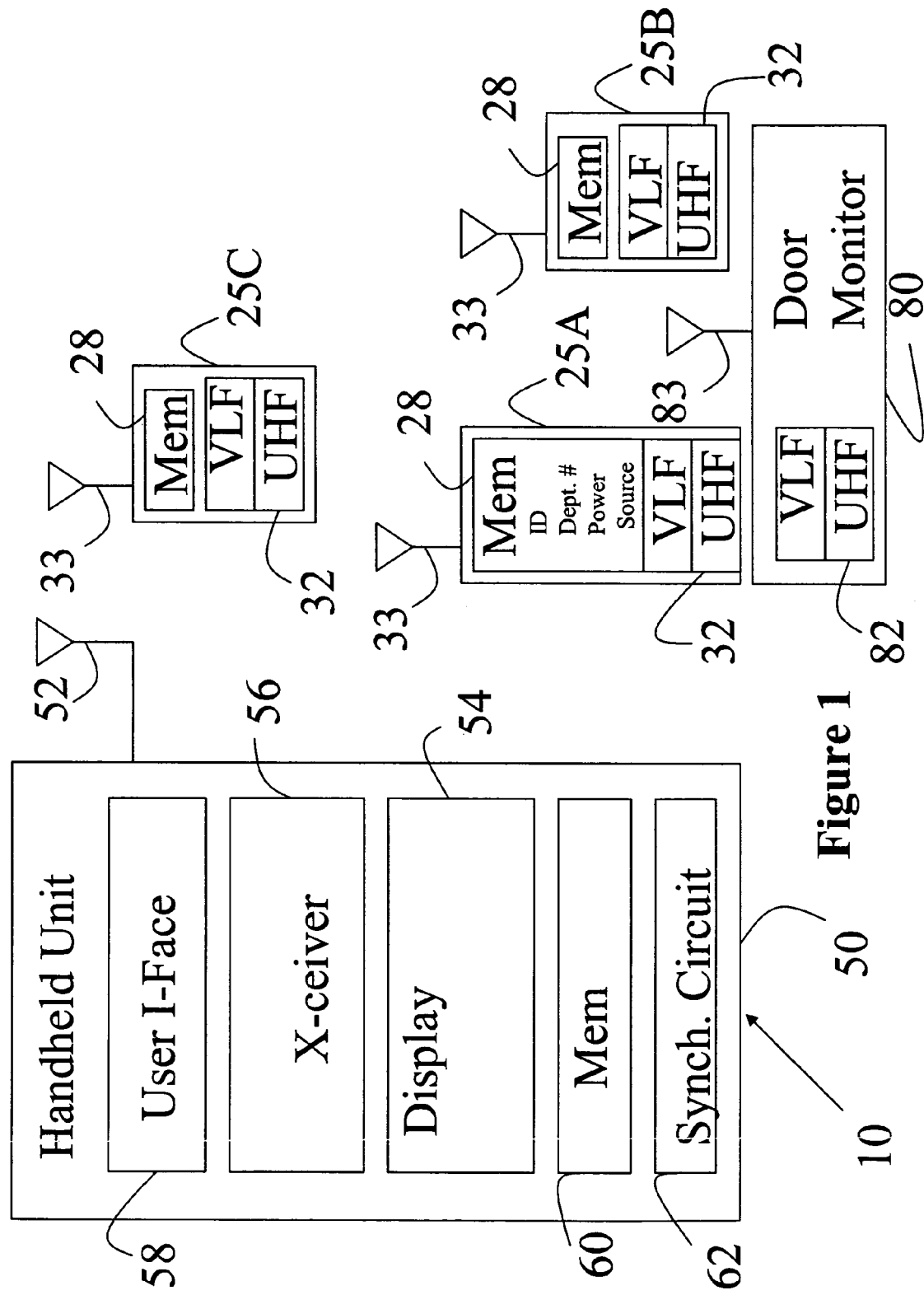
FIG. 1 is a general schematic block diagram of a locator/wander management system in accordance with an exemplary embodiment.

Referring to FIG. 1, a locator/wander management system 10 can be utilized in resident/personnel and/or asset tracking applications. System 10 can be particularly advantageous in large institutions and long-term care facilities, such as, hospitals, nursing homes, and universities, where significant amounts of expensive equipment are stored for long periods of time between uses and where residents and patients are monitored.

System 10 advantageously allows a user to more quickly locate assets and persons. System 10 is not limited to any particular locator/wander management applications or type of asset tracking. System 10 can be utilized to locate any type of asset including equipment, machines, devices, raw materials, live animals and human beings. System 10 allows personnel to be located outside of monitored areas associated with conventional wander monitor systems.

System 10 can be utilized with centralized asset tracking and security systems. For example, system 10 can be integrated with a central or host computer system 100 (FIG. 17), such as a PinPoint® system or a Code Alert® system manufactured by RF Technologies. According to another embodiment, system 10 can communicate with one or more databases associated with external networks, the Internet, host systems, workstations, desk top computers, laptop computers, etc.

System 10 includes a handheld unit 50, a set of radio frequency (RF) tag units 25A-C, and at least one monitor unit 80. System 10 advantageously can perform both wander management functions (e.g., associated with a Code Alert® wander management system from RF Technologies, Inc.) and locator functions (e.g., associated with Seeker® systems from RF Technologies, Inc.). System 10 can include a number of types of functions without departing from the scope of the invention.

Although three tag units 25A-C are shown, any number of tag units 25A-C can be utilized in system 10 without departing from the present invention. Handheld unit 50 provides an interrogation signal to units 25A-C, and units 25A-C respond to the interrogation signal by providing a tag identification to the handheld unit 50.

Handheld unit 50 includes a display 54, transceiver 56, a user interface 58, a memory 60 and a synchronization circuit 62. Handheld unit 50 can be embodied as a dedicated unit fabricated from ASICs, hardwired circuits, microprocessor-based control circuits configured by software, or other means for implementing at least one operation described below. Synchronization circuit 62 allows unit 50 to communicate with other computer systems and to exchange data with other databases remote from unit 50. Unit 50 can be placed in a synchronization and recharging cradle when not required for handheld use.

Monitor 80 is preferably a unit for securing an ingress or egress associated with a location. Monitor 80 is preferably part of a network of monitoring equipment, such as a Code Alert system. System 10 can include a multitude of monitors, such as door monitors.

In one embodiment, monitor 80 can be associated with a doorway and can include locking and unlocking capabilities according to a Code Alert system. Monitor 80 preferably includes a transceiver 82 with VLF and UHF capabilities. Preferably monitor 80 receives a VLF signal from tag units 25A-C when tag units 25A-C are within a particular distance from monitor 80. Monitor 80 can secure the ingress or egress in response to the VLF signal or can provide further communication to tags 25A-C via the UHF portion of transceiver 82. Alternatively, monitor 80 does not include UHF portion of transceiver 82. In one embodiment, monitor 80 is a Code Alert monitor and transceiver 82 is a VLF receiver.

In one embodiment, once the VLF signal is provided, monitor 80 can provide a UHF signal via transceiver 82 to unit 50 as well as to a centralized monitoring station indicating that a tag unit is near an ingress or egress and whether the ingress or egress has been secured. According to another embodiment, monitor 80 can include a sensor for determining whether one of units 25A-C has passed through the ingress or egress and provide a warning to unit 50 or a centralized monitoring station via transceiver 82. Advantageously, the same UHF portion of transceiver 82 can be used to communicate with tag units 25A-C and computer 50.

According to one embodiment, transceiver 56, transceiver 82 and transceiver 32 operate at a frequency of approximately 433 Mhz to provide frequency shift keyed (FSK) UHF signals. Transceivers 32 and 82 operate at 66 and 262 Khz to communicate VLF signals. Alternatively, transceiver 82 can be a receiver and operate only at the VLF frequency.

Handheld unit 50 can operate in a ranger mode to detect whether units 25A-C are in a particular area or in a tracking mode to find a unit 25A-C (whether or not the unit is in the particular area). Tag units 25A-C provide a periodic, locating beacon signal that can be received by transceiver 56. The beacon signal can be utilized by unit 50 to determine a location of or relative distance to a tag unit 25A-C when it has left a detection area. The periodic beacon signal can be provided in response to an interrogation signal from unit 50. Alternatively, the beacon signal can be automatically provided by units 25A-C for predetermined periods of time.

Unit 50 can be configured to perform a continuous roll call of all tag units 25A-C within a range (e.g., settable and up to 1000 ft.) of unit 50 in the ranger mode. If a tag unit 25A-C leaves the reception area of handheld unit 50, an alert can be issued from handheld unit 50 indicating that a tag unit 25A-C and its associated asset have left the area.

A user can configure handheld unit 50 in a tracker mode to search for the missing tag unit 25A-C utilizing a directional antenna such as antenna 57C (FIG. 2C). When not in a tracker mode, unit 50 can be placed in the sync-cradle so it does not consume unnecessary battery power and to ensure that it does not go into standby mode. Unit 50 can also be utilized with an additional battery to increase the application time without being in the sync-cradle.

With reference to FIGS. 2A-B, handheld unit 50 is preferably a commercially available handheld computer 59 (PDA) (such as those manufactured by Hewlett-Packard) combined with a plug-in RF module 57. Handheld computer 59 can be an Axim® X 50, manufactured by Dell. Plug-in RF module 57 can utilize a compact flash memory and a low power transceiver.

Display 54, a user interface 58, memory 60 and synchronization circuit 62 are implemented by handheld computer 59. Transceiver 56 is implemented by RF module 57. The use of handheld computer 59 provides significant hardware cost savings, reduces training time because handheld computer 59 has an already recognized easy to use interface, and allows unit 50 to be incorporated into equipment already carried by the user.

User interface 58 is preferably a touch screen associated with computer 59 (a commercially available handheld computer). Display 54 is preferably a color LCD display associated with computer 59. Transceiver 56 (e.g., module 57) can slide into the compact flash Type 2 slot in computer 59. Alternatively, module 57 can be a non-plug-in device coupled to handheld computer 57 by a connector. In another alternative, module 57 can be integrated within handheld computer 59.

An embodiment of handheld computer 59 executing locator and wander management software is shown as handheld computer 59 in FIG. 2B. Handheld computer 59 is preferably a pocket PC 0S2003-based device and memory 60 includes at least 512 megabytes of RAM. In addition, memory 60 can include or alternatively be flash memory, EEPROM, or any device for providing storage.

In one embodiment (FIG. 2A), module 57 can include an antenna 57A such as an omni-directional antenna. In another embodiment (FIG. 2C), a boom antenna 57B can be attached to handheld computer 59 or module 57. Antenna 57B can be attached to module 57 or computer 59 by a flexible coaxial cable. In one embodiment, antenna 57B has a handle 57C, a boom element 57D and three elements 57E. Boom element 57D is preferably square and has rounded corners. Elements 57E preferably include plastic end caps for safety.

Transceiver 56 can include an antenna 52 (e.g., Yagi for tracker mode or whip for ranger mode) (FIG. 1). Antenna 52 allows a user to determine the direction and relative distance to RF tag units 25A-C by pointing antenna 52 and monitoring the received signal strength from tag units 25A-C. Transceiver 56 preferably includes receiver circuitry and a microcontroller for decoding protocol to derive tag identification number, signal strength, and status of the tag.

The information decoded by the microcontroller on module 57 is provided to handheld computer 59 through the compact flash connector bus. Advantageously, a driver is not required because the compact flash UART within module 57 communicates as a stream interface device. Data from module 57 is accessed as if it were a communication port.

Transceiver 56 preferably operates at 433 megahertz bands in a true ultra-low power radio protocol and utilizes frequency shift keying (FSK). Transceiver 56 can achieve a bit rate of 9600 kilobit per second.

RF tag units 25A-C can be similar to SEEKER and Code Alert® tags manufactured by RF Technologies, Inc. that operate in accordance with at least one of the operations described below. An embodiment of such a tag is shown in FIG. 3 as tag units 25A-C.

Each of tag units 25A-C is preferably a complete, self-powered electronic assembly including an RF printed circuit board, transceiver chipset, a springwire antenna for transmit and receive, dual LF drive coils and lithium battery, sealed in a plastic housing. Tag units 25A-C preferably include a UHF transceiver for communicating with unit 50 and a VLF transceiver for communicating with monitor 80. Monitor 80 and units 25A-C can also communicate using UHF channels in one embodiment. An antenna 33 can be internal or external to the housing. Tag units 25A-C can be implemented in a variety forms. Units 25A-C can be transponder-based tags.

Memory 28 can be any form of data storage including an EEPROM. Memory 28 can be programmed at manufacture or installation. Alternatively, memory 28 can be programmed by providing data from handheld unit 50 to tag units 25A-C.

Tag units 25A-C preferably include low battery detection functionality. When one of tag units 25A-C is polled, it responds with its unique id and a status byte indicating its battery condition.

Units 25A-C can have dimensions of 1.9"×1.38"×0.7". Battery life is typically 2-3 years (depending on how often it is polled). Units 25A-C preferably have a range of 200-300 feet. Units 25A-C receive FSK transmissions at 433.92 MHz (the interrogation signal) from unit 50 in the form of a poll.

Tag units 25A-C wake up periodically and look to receive the preamble of the interrogation or poll signal from unit 50. Each unit of units 25A-C that sees the poll in the area of unit 50 stays awake while watching for the Start Of Frame (SOF) and following data. The following data can include the department ID number or facility identification number and a specific tag ID number for a tag specific poll. Preferably, in tag specific poll, only the specifically selected unit 25A-C responds. If doing a tag specific poll, the tag being polled immediately replies upon seeing the EOF and valid checksum.

Units 25A-C can also respond to the interrogation signal with an indication of the radio signal strength indication (RSSI). The indication is for the signal received by handheld unit 50 from tag units 25A-C. The RSSI can be displayed on display 54 of unit 50. The RSSI provides a rough indication of the proximity of unit 50 to the responding unit of tag units 25A-C.

In an alternative embodiment, the received signal strength can be related to the signal strength provided by unit 50 and measured tag units 25A-C. In such an embodiment, tag units 25A-C measure the received signal strength of the poll or interrogation signal from handheld 59. Tag units 25A-C provide an indication of the measurement to unit 50. According to one embodiment, when units 25A-C receive an interrogation signal or a poll, tag units 25A-C respond with a tag unit ID and a status byte indicating its battery condition.

When tag units 25A-C receive a tracking message (interrogation signal) from handheld unit 50, transceivers 25A-C respond with a beacon signal and go into a faster wake up sequence for 15 seconds to allow very fast poll responses (e.g., a fast poll mode). After the 15 seconds, both handheld unit 50 and tag units 25A-C go back to a normal wake up sequence.

Tag units 25A-C utilize a very low frequency (VLF) drive circuit for communication with wander monitor 80. The VLF drive circuit on units 25A-C take priority over all other polling operations to ensure the integrity of the wander management system.

According to one embodiment, each of tag units 25A-C can be assigned 1 of 240 tag identification numbers and 1 of 240 facility identification numbers. The identification numbers and facility identification numbers can be associated with other data in a database stored in a host system or on handheld unit 50. The associated data can include text and pictures further describing the tag units 25A-C, asset that is being tracked, facility, group, etc.

The software further allows history to be viewed so that results of previous polls with time stamps can be viewed. The software also allows data to be written to tags including IDs and manufacturing date code information to determine low batteries.

With reference to FIGS. 4-21, various operations performed by locator/wander management system 10 and components thereof are described below. Handheld unit 50 advantageously utilizes a graphical user interface (GUI) to receive commands from a user and provide data to the user. Although particular screen shots and particular methods of performing the operations are described and shown, they are for the purpose of illustration only and are not described in a limiting fashion. System 10 can perform the described operations in a variety of fashions without departing from the scope of the invention.

Preferably, software and/or firmware is executed by tag units 25A-C, tag unit 70, monitor 80 and handheld unit 50 to perform operations described below. The software for unit 50 is preferably Windows® CE-based, although other operating systems can be utilized.

Figure 4:
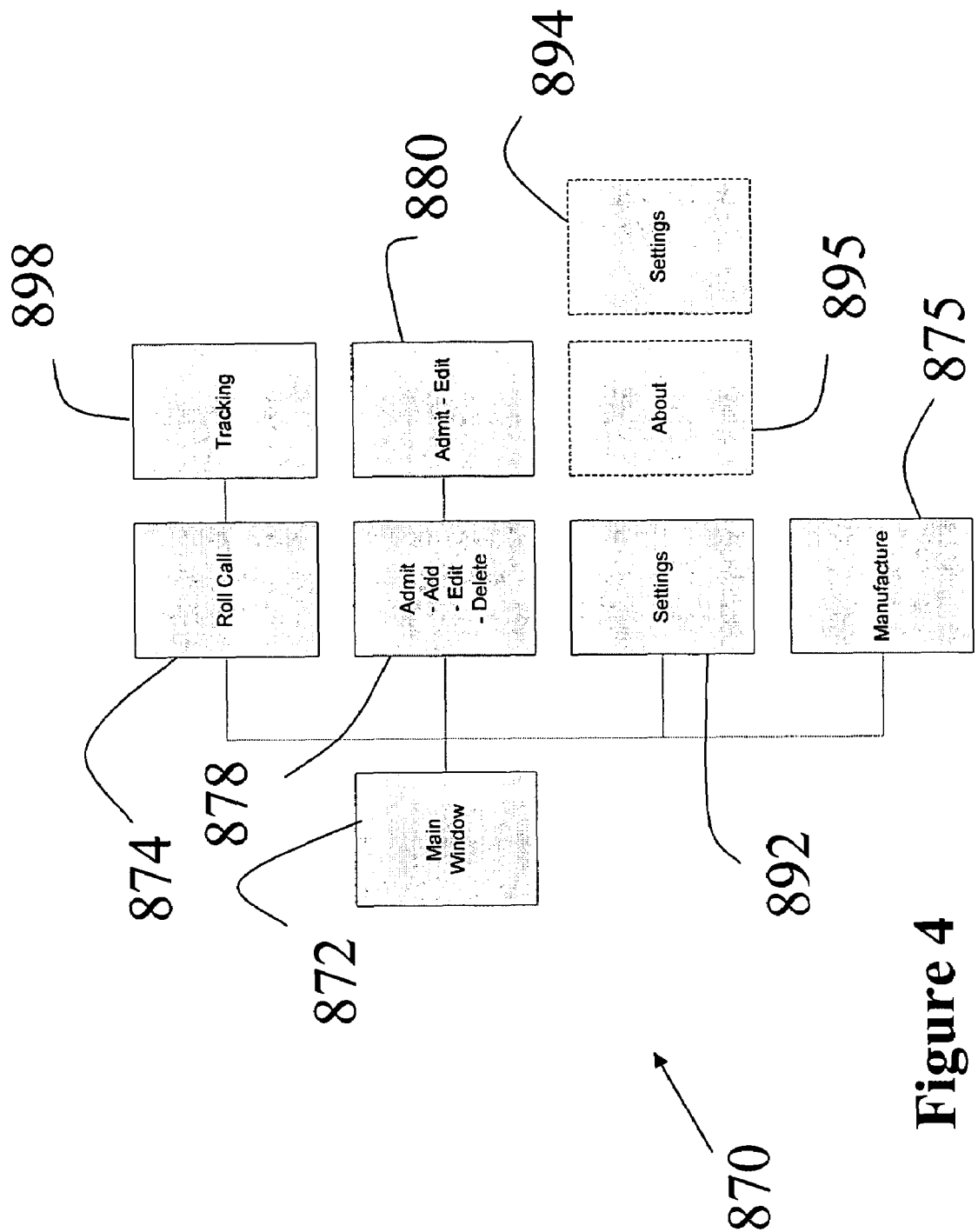
FIG. 4 is a general schematic block diagram of the windows hierarchy for software executed by the handheld computer illustrated in FIG. 2B in accordance with another exemplary embodiment.

With reference to FIG. 4, various operations for system 10 can be initiated through a windows hierarchy 870. The operations include a roll call operation in a window 874, an admit operation in a window 878, a manufacture operation in a window 875, and a settings operation in a window 892.

The roll call operation in window 874 includes a tracking operation in a window 898. The settings operation in window 892 includes an about operation in a window 895, and a more detailed settings operation in a window 894. The admit operation in window 878 includes an admit-edit operation in a window 880.

FIGS. 5-14 show screen shots for handheld unit 50 that are embodiments of windows hierarchy 870. Although a Windows GUI is discussed, it is not shown in a limiting fashion.

Figure 5:
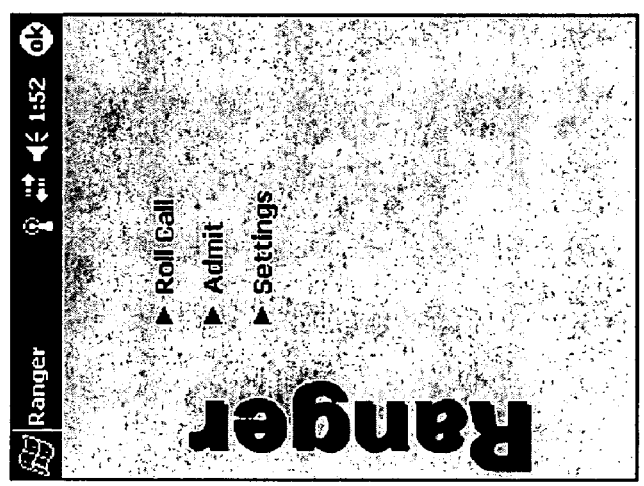
FIG. 5 is a main window screen shot for the handheld computer illustrated in FIG. 2B.

With reference to FIG. 5, window 872 is a main window within which the user can select a roll call operation, an admit operation, and a settings operation. In addition, a manufacturing operation can be selected from window 872 and is hidden based upon an XML file setting. Main window 872 is preferably the main navigation area.

Figure 6:
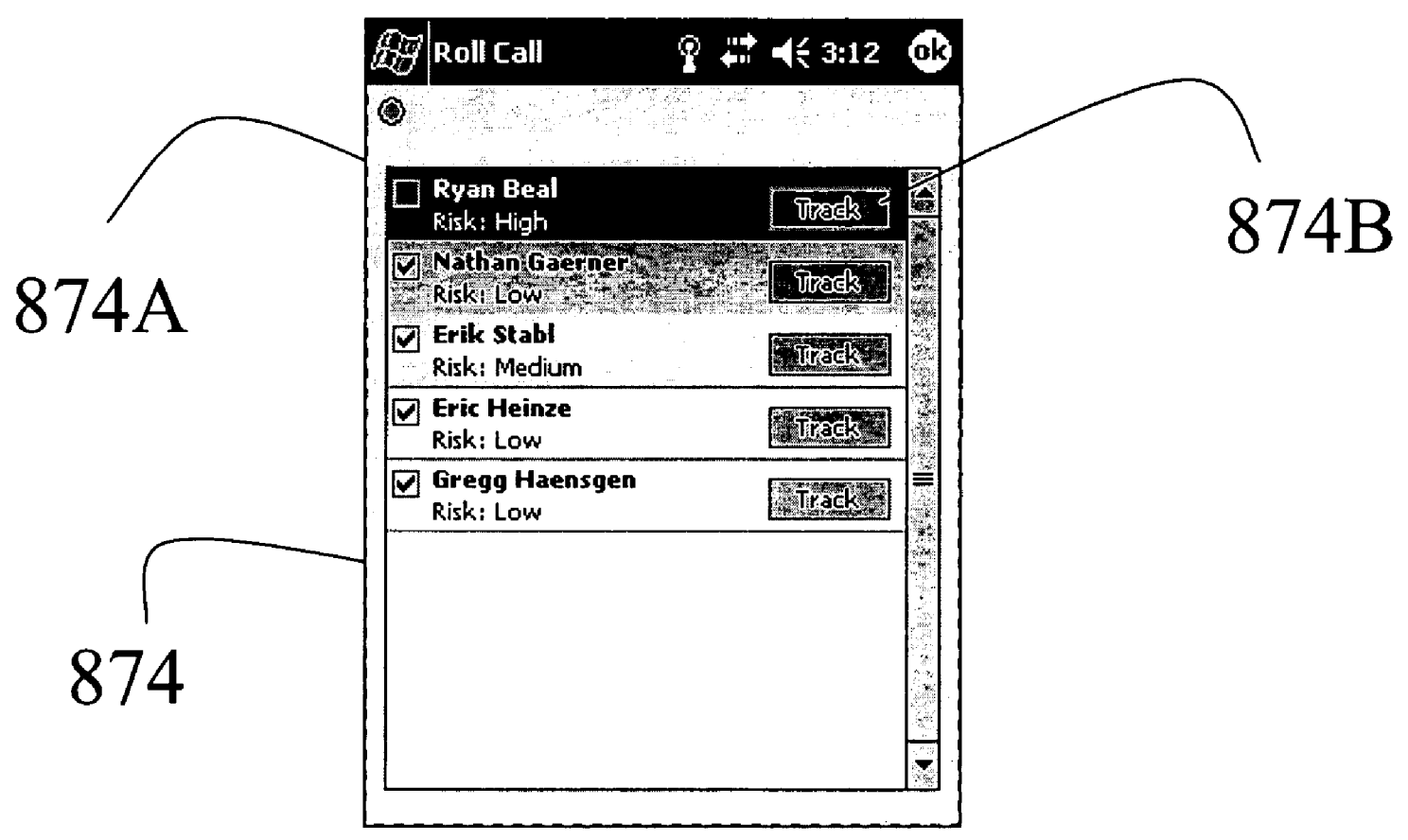

With reference to FIG. 6, window 874 provides a roll call operation in a ranger mode. The roll call operation provides a list of residents or assets associated with tag units 25A-C. A user can check the box next to a name to include a resident in the roll call operation. The check mark indicates whether the tag unit 25A-C associated with that resident is being monitored.

The roll call operation monitors the beacon signals for each resident on the list with a check mark. The list can include a resident's name and a risk level. If the beacon signal is not received within a particular number of minutes from tag unit 25A-C for a resident, the resident's name is highlighted and an alarm sounds. The name can be highlighted in red for an alarm condition. A blue dot 874A can be provided at an upper end when a beacon signal is being received by unit 50.

A user can select a track button 874B next to a resident's name. Track button 874B allows the user to search for the resident using a directional antenna. Button 874B initiates entry into tracker mode (e.g., window 898). When tracking, the selected tag unit 25A-C responds to the interrogation signal with an interrogation response beacon signal.

Figure 7:
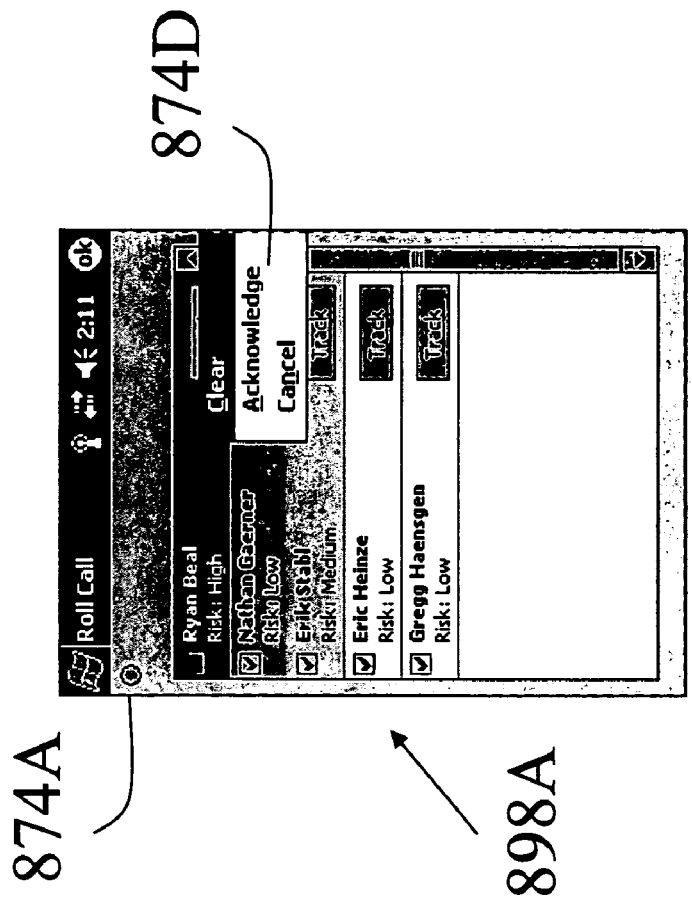
FIG. 7 is another roll call screen shot for the handheld computer illustrated in FIG. 2B.

In addition, a name can be highlighted in yellow if unit 25A-C for that name is in a low battery condition. Also, a low battery icon can be displayed next to the name. Highlighted items are provided at the top of the list of names. Following highlighted names, the remaining names are listed in alphabetical order. With reference to FIG. 7, once the alarm is acknowledged via a menu 874D, the name can be highlighted in pink. The alarm condition can also be provided with an auditory signal such as a beep. External speakers can be attached to computer 50 to increase the volume of an alarm.

Figure 8:
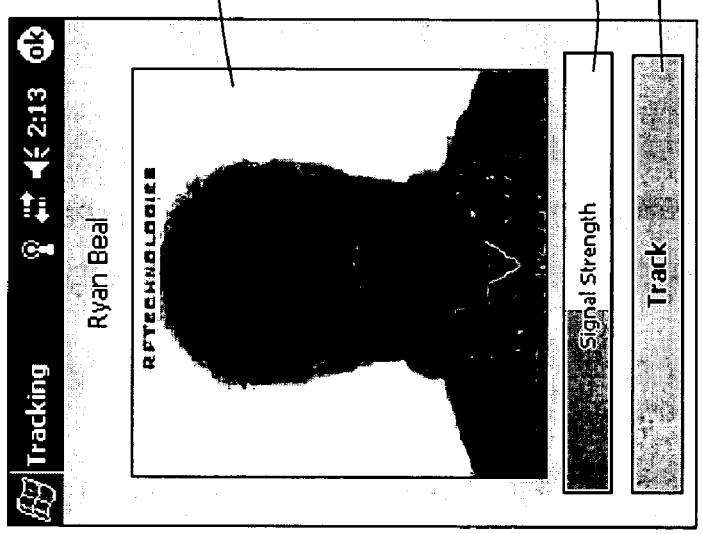
FIG. 8 is a tracking screen shot for the handheld computer illustrated in FIG. 2B.

With reference to FIG. 8, window 898 associated with tracking operation can display a picture of a resident, their name and the signal strength associated with the beacon signal received from one of RF tag units 25A-C. The signal strength can be displayed on a bar graph 898A. Beeper volume can also be adjusted according to signal strength. The sound can be a sonar-type sound and can be increased or decreased depending upon the RSSI value received.

Picture 898B is preferably stored in a database on computer 50. A user can select track button 898C to immediately provide a polling or interrogation signal. Upon receiving a response from tag unit 25A-C, both the tag unit 25A-C and the handheld unit 50 provide a faster poll mode for 15 seconds, thereby allowing superior tracking. After the 15 second period, computer 50 and units 25A-C return to a normal poll mode to conserve battery life.

Figure 9:
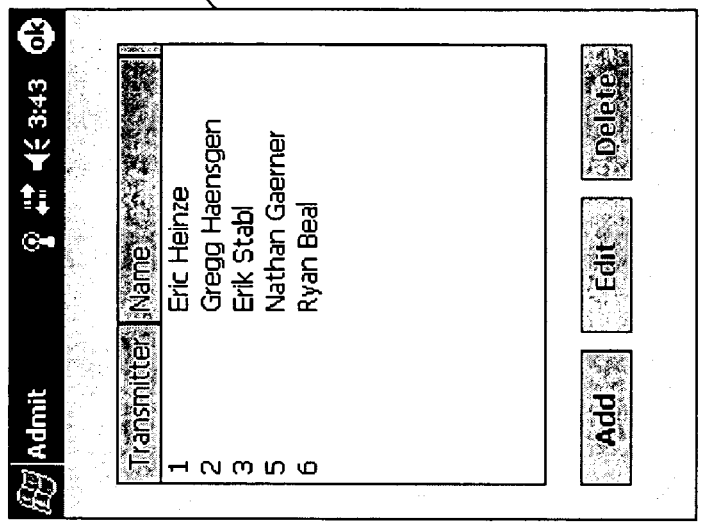
FIG. 9 is an admit screen shot for the handheld computer illustrated in FIG. 2B.

With reference to FIG. 9, window 878 is provided for an admit operation. The admit operation allows units 25A-C to be assigned to residents or other assets. Risk levels can be assigned to each resident in window 878.

Figures 10, 11:
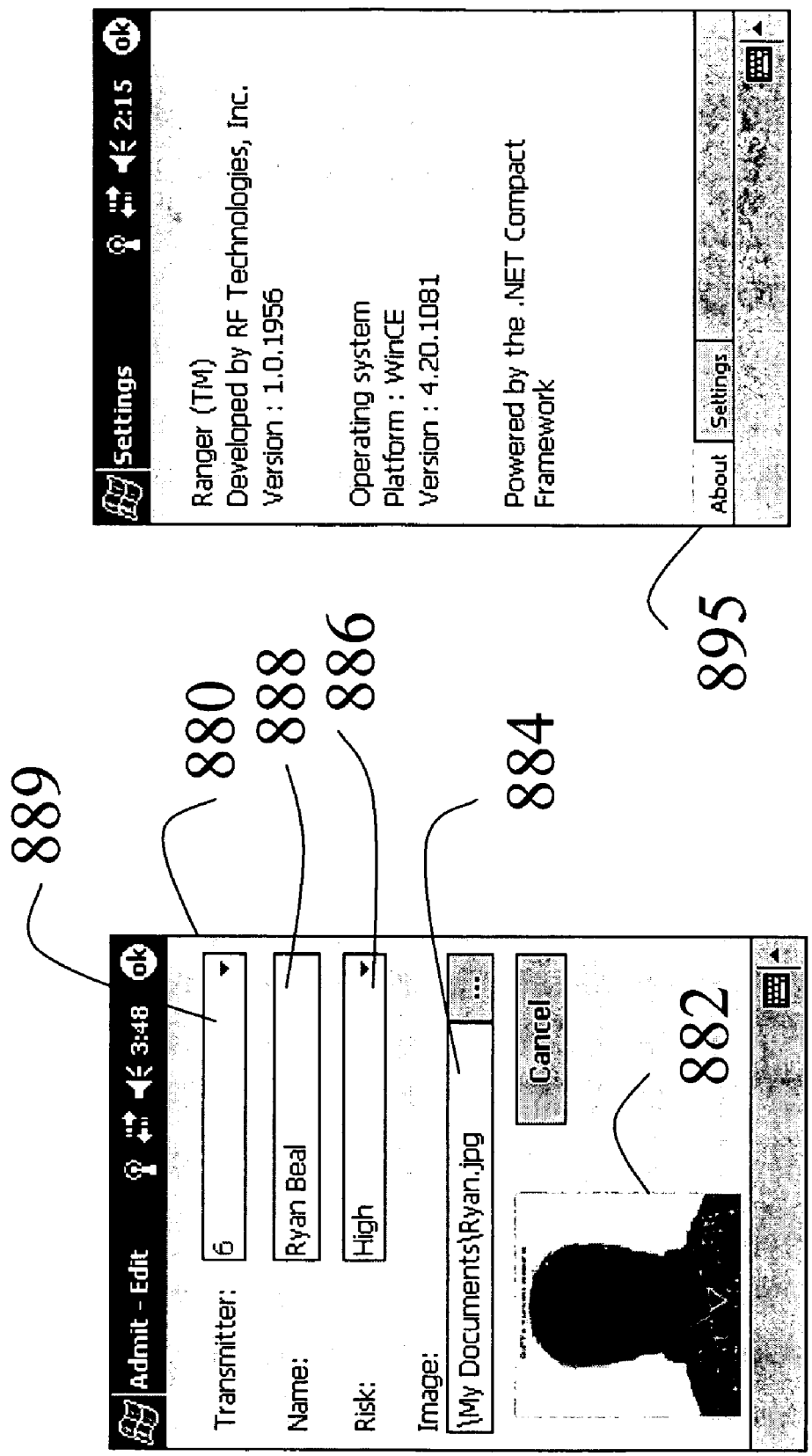
FIG. 10 is an admit-edit screen shot for the handheld computer illustrated in FIG. 2B.
FIG. 11 is a settings screen shot for the handheld computer illustrated in FIG. 2B.

With reference to FIG. 10, an admit-edit operation is provided in window 880. A transmitter ID number for units 25A-C can be provided at line 888 and a risk level can be provided at line 886. An image can be selected at line 884 and displayed in area 882.

With reference to FIG. 11, window 895 for the settings operation provides information about the application that can be useful for troubleshooting and upgrading. With reference to FIG. 12, window 894 allows a user to change the settings for particular applications. A COM port setting at line 897 can be changed to allow the user to specify the communications port if the auto-detect function does not operation. A line 892 is used to set the amount of time that passes before an alert is issued if beacon signals from units 25A-C are not received. A detection range can be used to set the distance unit 50 can be from unit 25A-C and still be received.

The settings operation can also allow a system to be set in a demo mode. The demo mode generates beacon signals from selected units 25A-C (e.g. units 1-3) once every 10 seconds. Any units 25A-C entered into system 10 that are not units 1-3 alarm in this mode. A demo mode indication can be provided in other screens.

Figure 13:
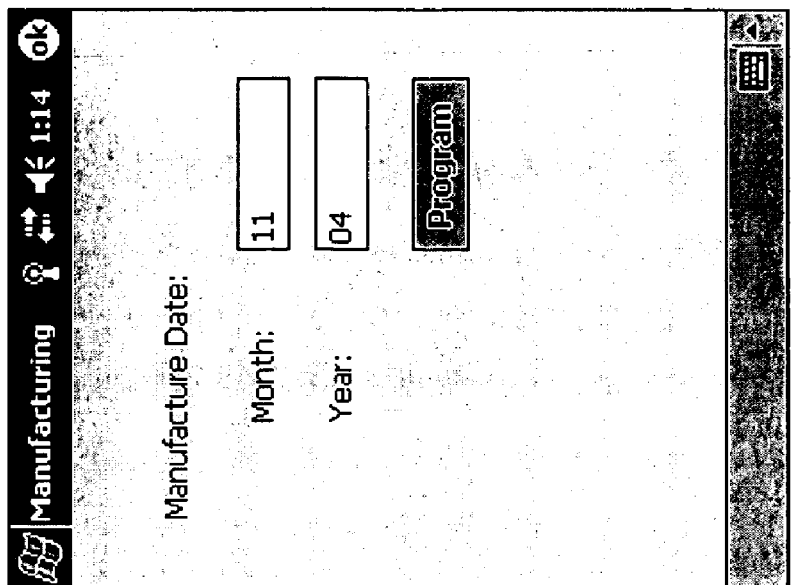
FIG. 13 is a manufacturing screen shot for the handheld computer illustrated in FIG. 2B.
Figure 14:
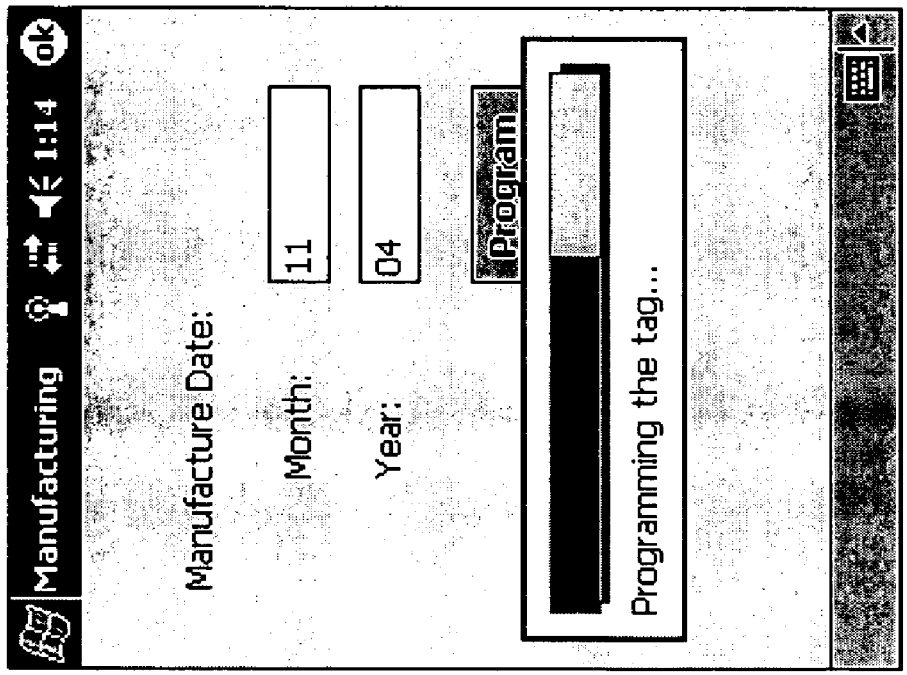
FIG. 14 is another manufacturing screen shot for the handheld computer illustrated in FIG. 2B.

With reference to FIG. 13, a manufacturing operation in window 875B can be utilized to program one of tag units 25A-C. With reference to FIG. 14, a screen shot 875B shows a programming tag function.

With reference to FIG. 14, a screen shot 891 associated with a computer coupled with handheld unit 50 via synchronization circuit 62 can perform a synchronization operation.

With reference to FIG. 15, synchronization circuit 62 (FIG. 1) can be utilized with a synchronization cradle associated with handheld computer 59 (FIG. 2). When computer 59 is inserted into the cradle, the database and the PDA can be synchronized with an MRM configuration database. An SQL server CE database can be present in the PDA and synchronized when the PDA is connected to a host computer. A menu option can be available in the user interface to allow the user to select where and when to synchronize as shown on screen 891 (FIG. 15).

Preferably, this synchronization process allows handheld unit 50 to upload its current collection of history records. Each time a tag unit 25A-C is read, a time stamp record is made of the tag read. These records can be uploaded to a PinPoint® recorder service or a host computer for inclusion in a log such as a PP Data Log. This allows the data to be visible to other PinPoint® applications such as, the PinPoint® Information Center.

Figure 16:
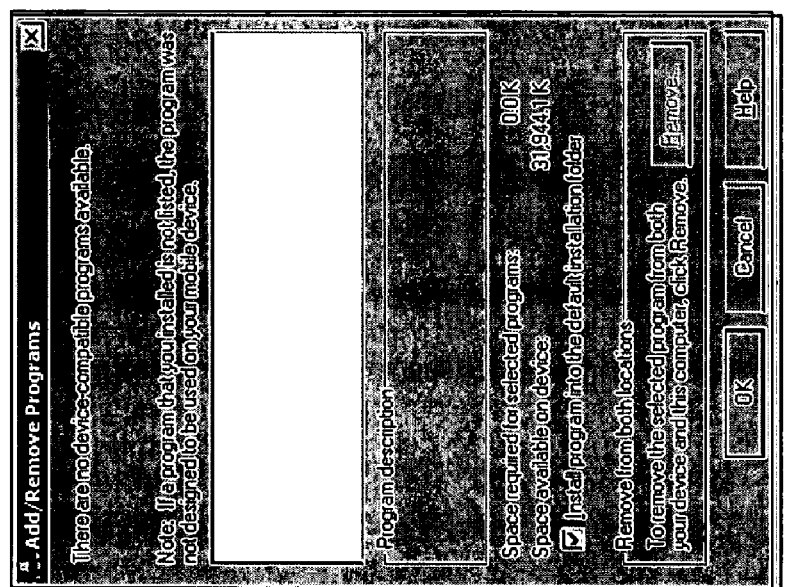
FIG. 16 is a add/remove programs screen shot for the host computer communicating with the handheld computer illustrated in FIG. 2B.

Synchronization screen 891 allows software to be loaded from a host PC (e.g., from a CD rom on a host machine). Application software can be loaded via Microsoft ActiveSync Add/Remove Program application on the host PC. When unit 50 is placed in the sync-cradle, the application will be copied to the programs directory of the PDA as show in screen shot 891. With reference to FIG. 16, screen 876 allows the user to install a program.

Figure 17:
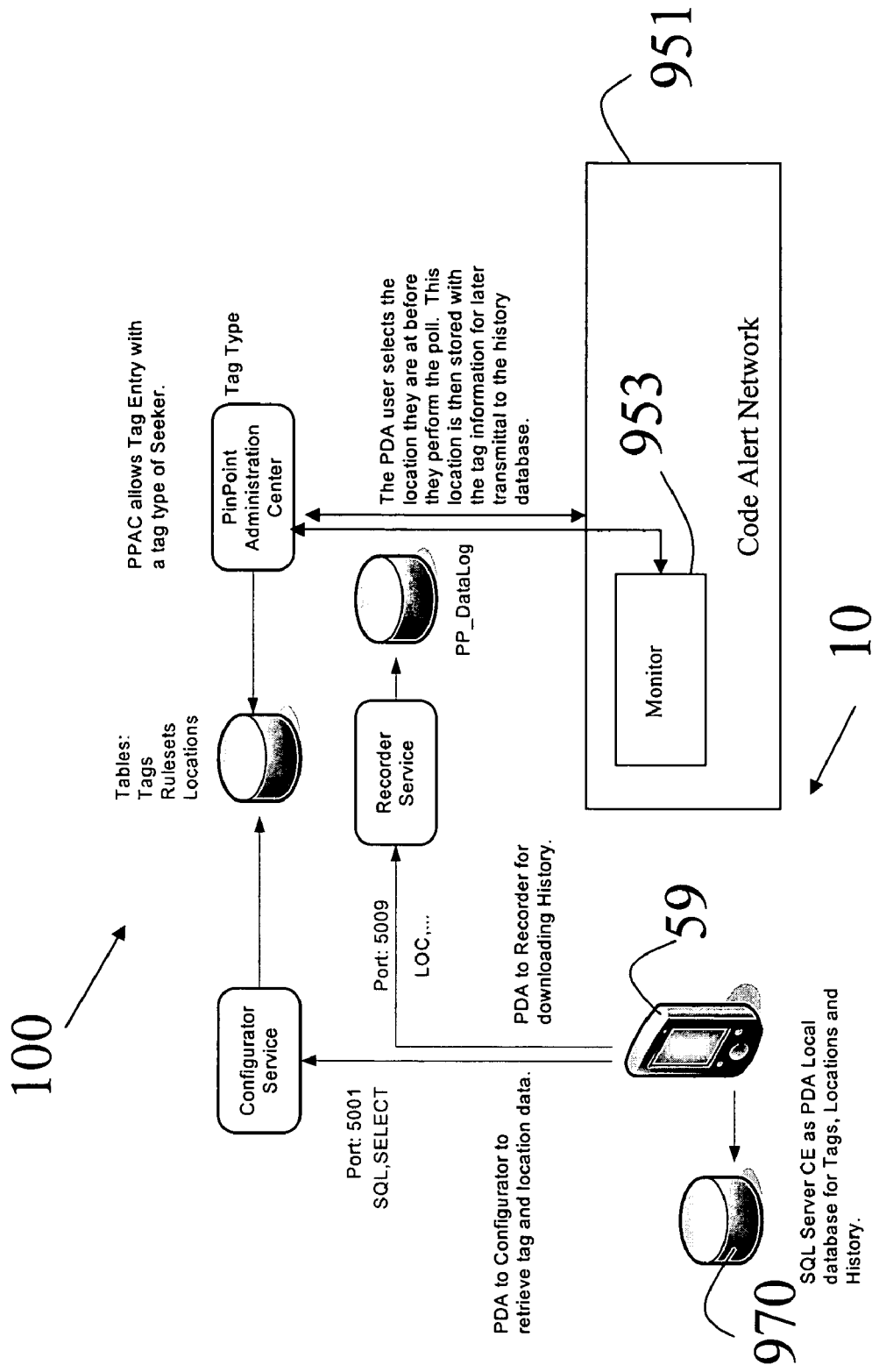
FIG. 17 is a general block diagram of the locator/wander management system illustrated in FIG. 1 employed in a host computer system in accordance with yet another exemplary embodiment.

With reference to FIG. 17, locator system 10 can be utilized as part of a larger system 100 such as a PinPoint® system or Code Alert® system. System 100 can include a Code Alert network 951 with at least one monitor 953. Handheld computer 59 also communicates with SQL server 940 for local storage.

Figure 18:
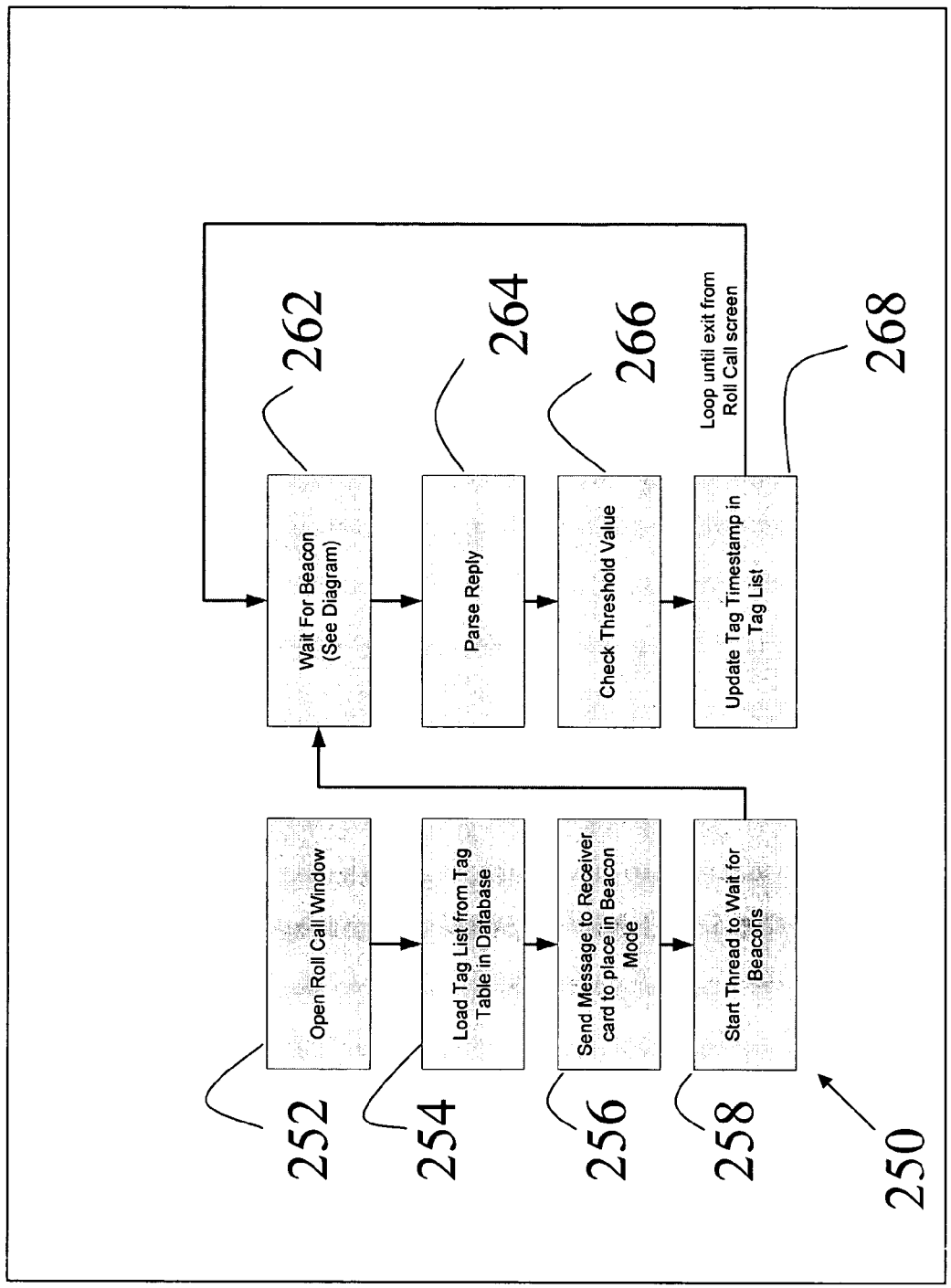
FIG. 18 is a flow chart showing a roll call operation for the system illustrated in FIG. 1 in accordance with still another exemplary embodiment.

With reference to FIG. 18, a flow chart 250 shows a roll call operation for system 10. At a step 252, window 874 (FIG. 6) is opened for the roll call operation. At a step 254, the tag list from the tag table in a database of unit 50 is loaded for the roll call operation. At a step 256, a message is sent to module 57 so that a beacon mode is begun. At a step 258, a thread is started to wait for beacon signals. At a step 262, a wait for beacon process is performed.

At a step 264, a reply is parsed (the data received is separated into fields). At a step 266, the threshold value is checked for the reply signal. The threshold value is the minimum signal strength needed to process the received signal. At a step 268, the time stamp is updated in the tag list. After step 268, step 262 is performed in a loop until window 874 is exited.

Figure 19:
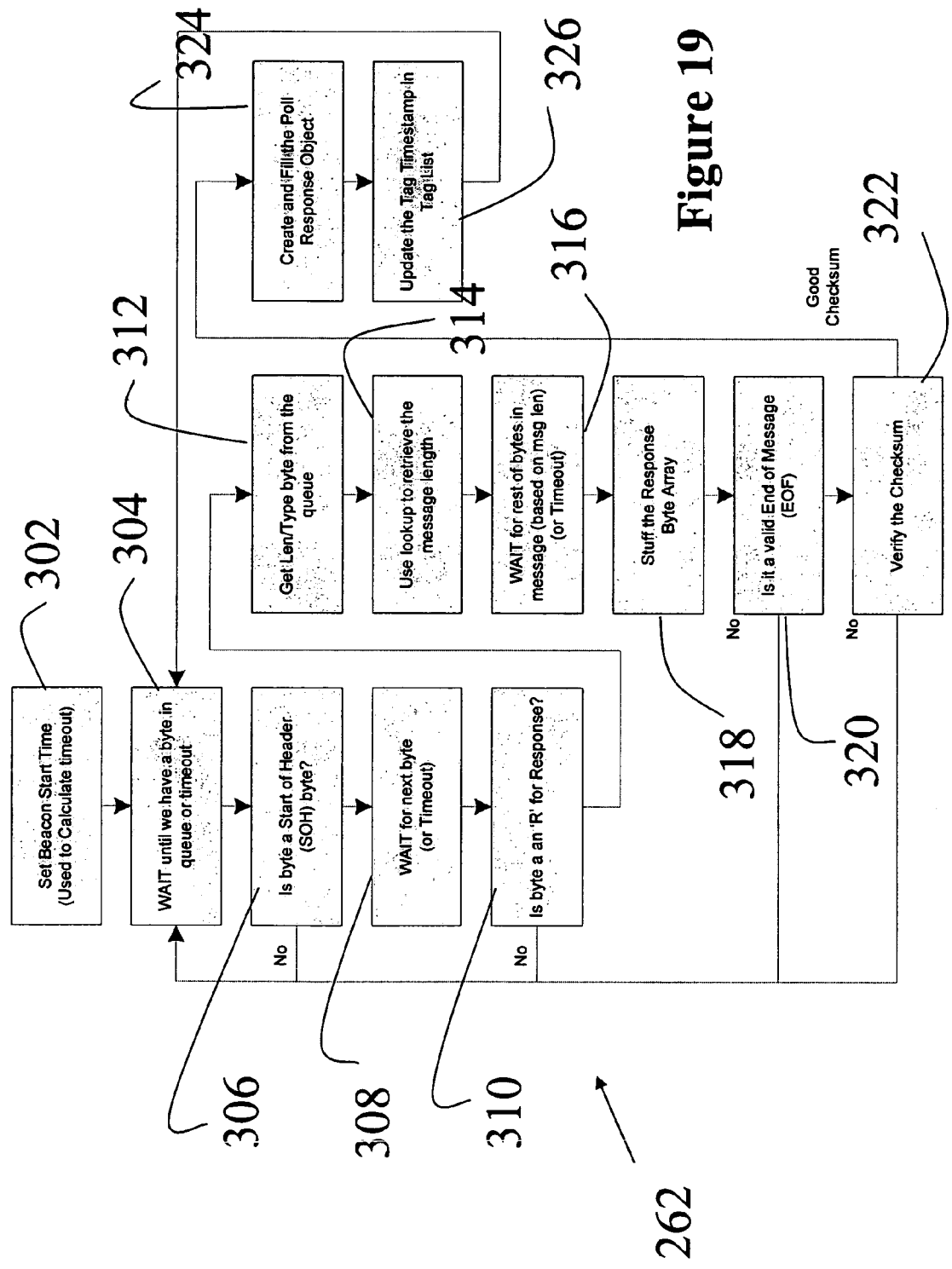
FIG. 19 is a flow diagram showing a wait for beacon operation used in the roll call operation illustrated in FIG. 18 for the system illustrated in FIG. 1 in accordance with another exemplary embodiment.
Figure 20:
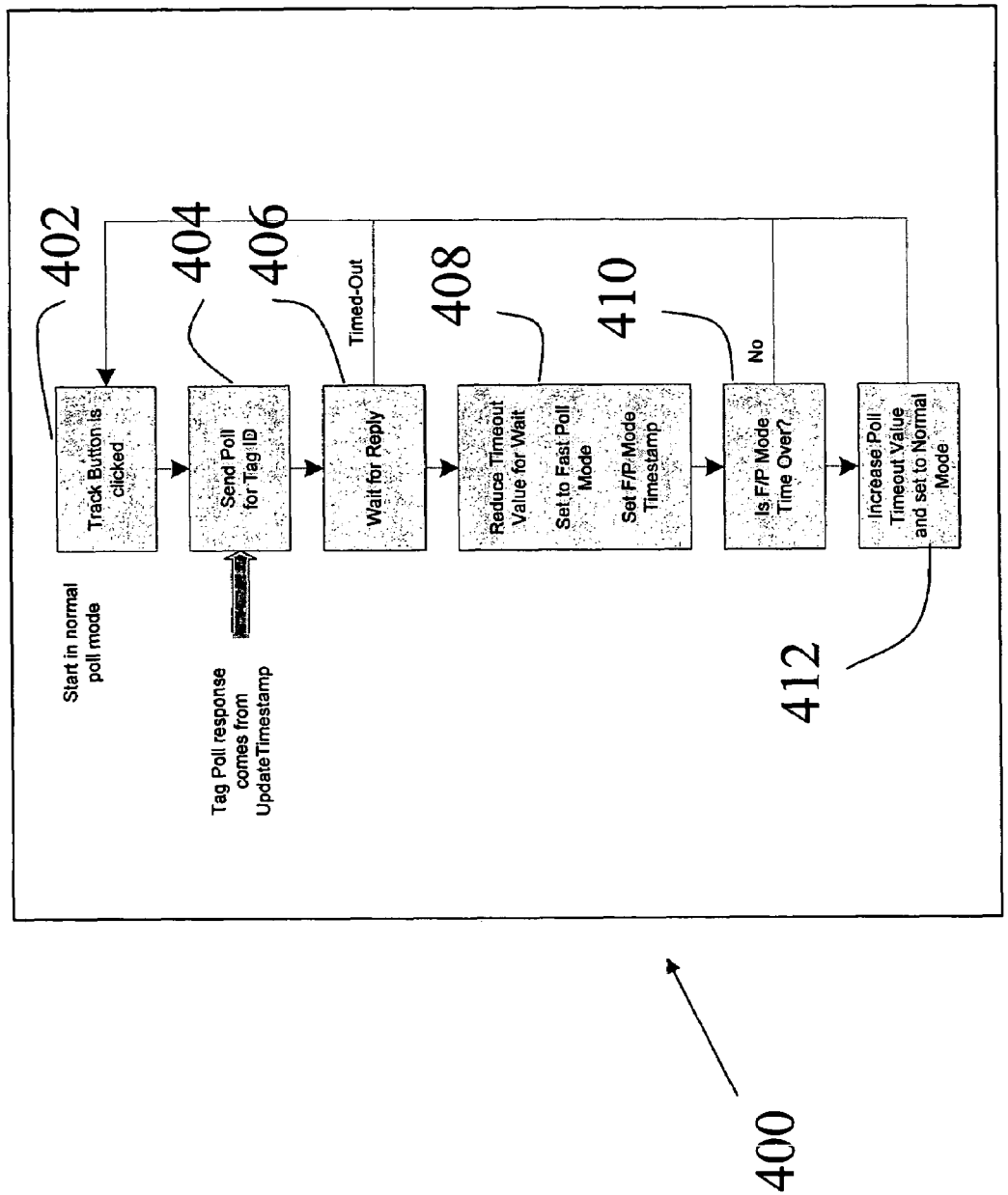
FIG. 20 is a flow diagram for a track operation for the system illustrated in FIG. 4 in accordance with still another exemplary embodiment.

With reference to FIG. 19, a wait for beacon process 262 is performed associated with flow chart 350 (FIG. 18). At a step 302, a beacon start time is set. The beacon start time represents the amount of time required for a time out. At a step 304, the unit 50 waits until a byte is obtained in the received queue or a time out occurs. At a step 306, the byte is analyzed to determine if it is a start of a header byte. At a step 308, the unit 50 waits for the next byte or a time out. At a step 310, the byte is analyzed to determine if it is an R for response byte.

In step 306, if the byte is not a start of header byte, unit 50 returns to step 304. In step 310, if the byte is not an R for response byte, unit 50 returns to step 304. After step 310, if the byte is an R byte, unit 50 advances to a step 312 to determine the length and type of byte from the queue.

At a step 314, a look up table is utilized to retrieve the message length. At a step 316, the unit 50 waits for the rest of the bytes in the message or times out. At a step 318, the response is stepped into a byte array. At a step 320, the byte array is analyzed to find a valid end of message. If no valid end of message is found, unit 50 returns to step 304. If a valid end of message is found, the check sum is verified at a step 322. If the check sum is not valid, the computer returns to step 304. If the check sum is valid, unit 50 advances to step 324 and creates and fills the poll response object. The poll response object contains information about the tag unit and its status. At a step 326, the time stamp for the tag unit is updated in the tag list and computer returns to step 304.

Unit 50 can exit window 874 by entering a window 898 associated with a tracking operation as shown in flow chart 400. At a step 402, tracking button 874B is clicked associated with a particular resident. At a step 404, a poll signal or interrogation signal is sent for the identified tag unit 25A-C. At a step 406, computer 50 waits for a reply. If no reply is received, computer 50 returns to step 402 which is in a normal poll mode. The normal poll mode wakes up every 4-5 seconds to conserve battery life. At a step 408, a fast poll mode is begun. In the fast poll, units 25A-C emit signals more frequently. At a step 410, a time is checked to determine if the fast poll mode time is expired (e.g., 15 seconds). The fast poll mode allows immediate responses from tags 25A-C. After the 15 seconds, units 25A-C and computer 50 go to the normal poll mode in a step 412. After step 412, computer 50 returns to step 402.

Figure 21:
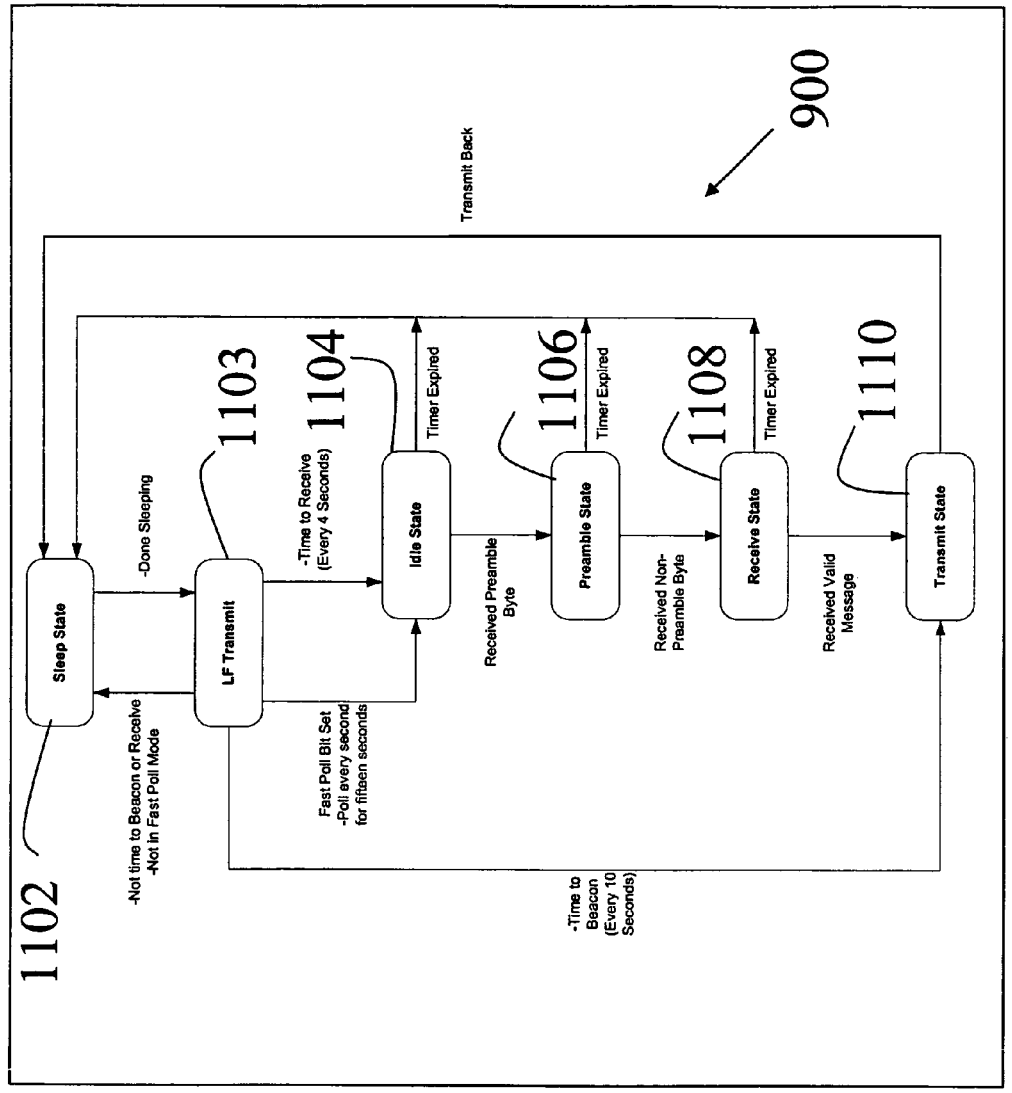
FIG. 21 is a state chart for the RF tag illustrated in FIG. 3.

With reference to FIG. 21, a flow chart 900 illustrates operation of tag units 25A-C. In a state 1102, tag units 25A-C exist in a sleep state. In a state 1104, an idle state is reached. At a step 1106, a preamble state is reached in which a preamble is received and stored. At a step 1108, a receive state is reached when a non-preamble byte is reached. At a state 1110, a transmission of a beacon signal occurs and units 25A-C return to sleep state 1102. At a state 1103, units 25A-C provide the low frequency transmission for the Code Alert system.

After a time period when units 25A-C are done sleeping, a low frequency transmit state 1103 is reached. After state 1103, units 25A-C can return to sleep state 1102 if it is not time to provide a beacon signal, or if a polling signal is not received, or if units 25A-C are not in a fast poll mode. From state 1103, units 25A-C reach state 1104 if it is in a fast poll mode or if it is time to receive (every 4 seconds). Units 25A-C can return to sleep state 1102 if the timer has expired in state 1104, or if a preamble byte is received, units 25A-C advance to state 1106. If a timer state expires, units 25A-C return to sleep state 1102. If a non-preamble byte is received, units 25A-C advance to state 1108. If the timer expires, units 25A-C return to sleep state 1102. If a valid message is received, state 1110 is reached and the UHF signal is transmitted. After state 1110, sleep state 1102 is reached.

It is understood that, while preferred embodiments, examples and values are given, they are for the purpose of illustration only. The apparatus and method of the invention are not limited to the precise details and conditions disclosed. For example, although specific geometries, ranges, and protocols and types of operations are described, other algorithms, dimensions, and protocols could be utilized. Thus, changes may be made to the details disclosed without departing from the spirit of the invention, which is defined by the following claims.

What is claimed is:

1. A locator/wander management system, comprising:
    a handheld unit for receiving a beacon signal;
    a tag unit associated with a monitored object or person for periodically providing the beacon signal, wherein the handheld unit determines a presence of the tag unit in response to the beacon signal wherein the beacon signal is a UHF signal provided by a UHF circuit; and
    at least one wander monitor associated with a location, wherein the tag unit periodically provides a wander monitor signal, and the wander monitor receives the wander monitor signal and secures an egress or ingress associated with the location in response to the wander monitor signal wherein the wander monitor signal is periodically provided by a VLF circuit, wherein the wander monitor signal is a VLF signal.

2. The system of claim 1, wherein the handheld unit is a PDA including a plug-in RF module.

3. The system of claim 1, wherein the tag unit also provides an indication of power source life.

4. The system of claim 3, wherein the indication is transmitted each time in response to an interrogation signal or with the periodic beacon signal.

5. The system of claim 3, wherein the indication is stored on the handheld unit, and the handheld unit provides a notification when the power source life is expected to expire based upon the indication.

6. The system of claim 1, wherein a process for the wander monitor signal has a higher priority than a process for the beacon signal.

7. The system of claim 1, further comprising:
    a central computer capable of communication with the handheld unit, wherein an indication is provided from the handheld unit to the central computer when the power source is expected to expire.

8. A method of locating an article or person, the method comprising:
    providing an interrogation signal with a handheld computer equipped with an RF interface;
    providing a first signal in response to the interrogation signal with a tag unit associated with the article or person wherein the first signal is a UHF signal provided by a UHF circuit;
    displaying on the handheld computer an indication of the presence or absence of the article or person in response to the first signal; and
    securing an egress or ingress in response to a second signal from the tag unit, wherein the second signal is periodically provided as a very low frequency signal provided by a VLF circuit.

9. The method of claim 8, wherein the RF interface is a transceiver card module.

10. A locator/wander management system, comprising:
    a mobile transceiver for providing an interrogation signal and receiving periodic beacon signals;
    a plurality of tag units, each tag unit responds to the interrogation signal, each tag unit including a memory storing an identification, a UHF circuit, and a VLF circuit, the UHF circuit receiving the interrogation signal and providing the identification to the mobile transceiver in response to the interrogation signal using the UHF circuit, the UHF circuit also providing the periodic beacon signals; and
    at least one stationary receiver associated with an exit, wherein the tag unit periodically provides a VLF signal via the VLF circuit, and the stationary receiver receives the VLF signal and secures the exit.

11. The locator/wander system of claim 10, wherein the mobile transceiver displays an indication of the identification for each tag having a particular facility identifier.

12. The locator/wander management system of claim 10, wherein the mobile transceiver includes a database including the identification.

13. The locator/wander management system of claim 10, wherein the mobile transceiver includes a database including a picture associated with the identification.

14. The locator/wander management system of claim 10, wherein the mobile transceiver includes a directional antenna for a tracker mode and an omnidirectional antenna for a monitor mode.

15. The locator/wander management system of claim 10 wherein the mobile transceiver is a commercially available handheld device including an RF plug-in module.

16. The locator/wander management system of claim 10, wherein the mobile transceiver provides an indication of signal strength associated with a response signal from the tag units.

17. The locator/wander management system of claim 10, wherein the mobile transceiver provides an alarm if one of the beaconing signals is not received from one of the tag units in an amount of time.

18. The locator/wander management system of claim 10, wherein the mobile transceiver includes a graphical user interface.

19. The locator/wander management system of claim 12, wherein the mobile transceiver stores a list of monitored residents.

20. The locator/wander management system of claim 10, wherein the tag unit and the mobile transceiver operate in a fast poll mode when in a tracker mode after the tag unit responds to the interrogation signal.

* * * * *

UNITED STATES PATENT AND TRADEMARK OFFICE
CERTIFICATE OF CORRECTION

PATENT NO. : 7,365,645 B2  
APPLICATION NO. : 11/378804  
DATED : April 29, 2008  
INVENTOR(S) : Heinze et al.

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 54 days Delete the phrase "by 54 days" and insert -- by 101 days --

Signed and Sealed this

Fourth Day of November, 2008

JON W. DUDAS  
*Director of the United States Patent and Trademark Office*